(12) United States Patent
Goldberg

(10) Patent No.: US 9,604,100 B2
(45) Date of Patent: Mar. 28, 2017

(54) SPORTS TRAINING AID

(71) Applicant: Robert Marc Goldberg, Fayetteville, NY (US)

(72) Inventor: Robert Marc Goldberg, Fayetteville, NY (US)

( * ) Notice: Subject to any disclaimer, the term of this patent is extended or adjusted under 35 U.S.C. 154(b) by 0 days.

(21) Appl. No.: 14/872,550

(22) Filed: Oct. 1, 2015

(65) Prior Publication Data
US 2016/0096066 A1    Apr. 7, 2016

Related U.S. Application Data

(60) Provisional application No. 62/058,899, filed on Oct. 2, 2014.

(51) Int. Cl.
| | | |
|---|---|---|
| *A63B 69/00* | (2006.01) | |
| *A63B 71/14* | (2006.01) | |
| *A63B 24/00* | (2006.01) | |
| *A63B 71/06* | (2006.01) | |

(52) U.S. Cl.
CPC .......... *A63B 24/0003* (2013.01); *A63B 59/20* (2015.10); *A63B 69/00* (2013.01); *A63B 71/0622* (2013.01); *A63B 2071/0625* (2013.01); *A63B 2071/0655* (2013.01); *A63B 2071/0658* (2013.01); *A63B 2102/14* (2015.10); *A63B 2208/0204* (2013.01); *A63B 2220/17* (2013.01); *A63B 2220/24* (2013.01); *A63B 2220/40* (2013.01); *A63B 2225/20* (2013.01); *A63B 2225/50* (2013.01)

(58) Field of Classification Search
USPC .......................................... 473/409, 512–514
See application file for complete search history.

(56) References Cited

U.S. PATENT DOCUMENTS

| | | | |
|---|---|---|---|
| 4,254,956 | A | 3/1981 | Rusnak |
| 4,615,526 | A | 10/1986 | Yasuda et al. |
| 5,031,909 | A | 7/1991 | Pecker |
| 5,056,783 | A | 10/1991 | Matcovich et al. |
| 5,651,549 | A | 7/1997 | Dill et al. |
| 7,651,418 | B2 | 1/2010 | Appleton et al. |
| 8,152,661 | B2 | 4/2012 | House |
| 8,162,772 | B1 | 4/2012 | Galloway |
| 8,172,722 | B2 | 5/2012 | Molyneux et al. |
| 8,414,411 | B2 | 4/2013 | Stites et al. |

(Continued)

FOREIGN PATENT DOCUMENTS

| | | |
|---|---|---|
| EP | 1908499 A1 | 4/2008 |
| EP | 2641235 A1 | 9/2013 |

OTHER PUBLICATIONS

International Search Report and Written Opinion of the International Searching Authority, International Application No. PCT/US2015/053486, mailed Dec. 21, 2015.

*Primary Examiner* — Nini Legesse
(74) *Attorney, Agent, or Firm* — Paul Frank + Collins P.C.

(57) ABSTRACT

A sports training aid is configured to help improve a player's skills in the game of lacrosse. The sports training aid can embody a lacrosse stick with a head and shaft. In one implementation, the lacrosse stick includes one or more sensors that change state. A controller couples with the sensors to administer one or more training modes. Each training mode can cause the controller to associate the change in state of the sensors in response to movement of the head.

23 Claims, 15 Drawing Sheets

(56) References Cited

U.S. PATENT DOCUMENTS

| | | | |
|---|---|---|---|
| 8,602,922 B2* | 12/2013 | Schwenger | A63B 49/00 473/549 |
| 2003/0017882 A1 | 1/2003 | Hossack | |
| 2003/0207718 A1 | 11/2003 | Perlmutter | |
| 2008/0015058 A1 | 1/2008 | Noble et al. | |
| 2009/0029754 A1 | 1/2009 | Slocum et al. | |
| 2011/0212757 A1 | 9/2011 | Murdock et al. | |
| 2011/0304497 A1 | 12/2011 | Molyneux et al. | |
| 2012/0139727 A1 | 6/2012 | Houvener et al. | |
| 2012/0190486 A1 | 7/2012 | Hubschmann | |
| 2012/0295740 A1 | 11/2012 | Creguer | |
| 2013/0053190 A1* | 2/2013 | Mettler | G09B 19/0038 473/463 |
| 2013/0184091 A1 | 7/2013 | Rauchholz et al. | |
| 2015/0054632 A1 | 2/2015 | Ben Ezra | |
| 2015/0202510 A1 | 7/2015 | Appleton et al. | |

* cited by examiner

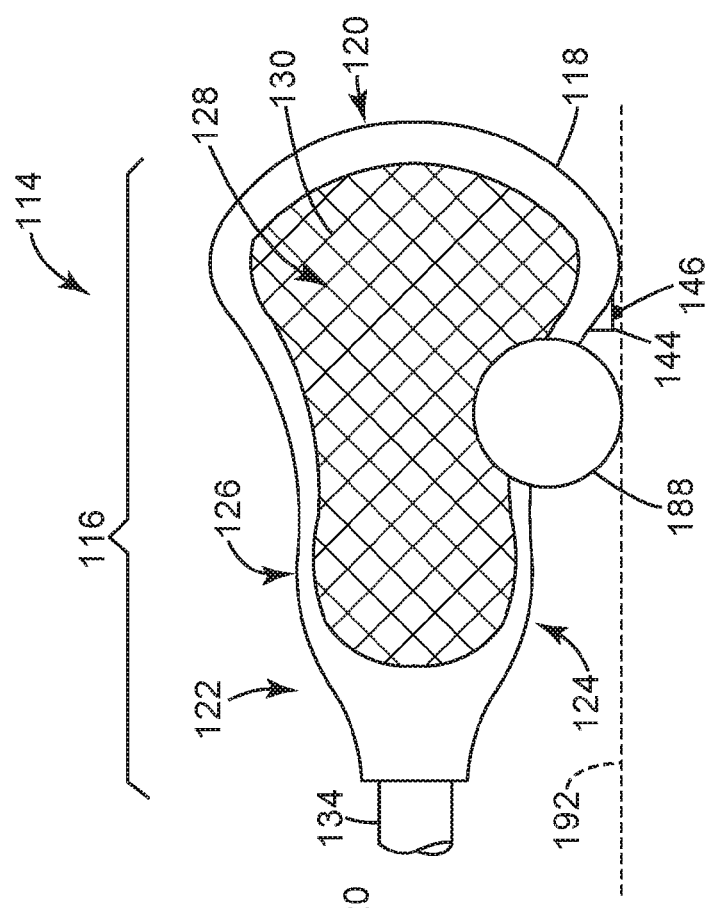
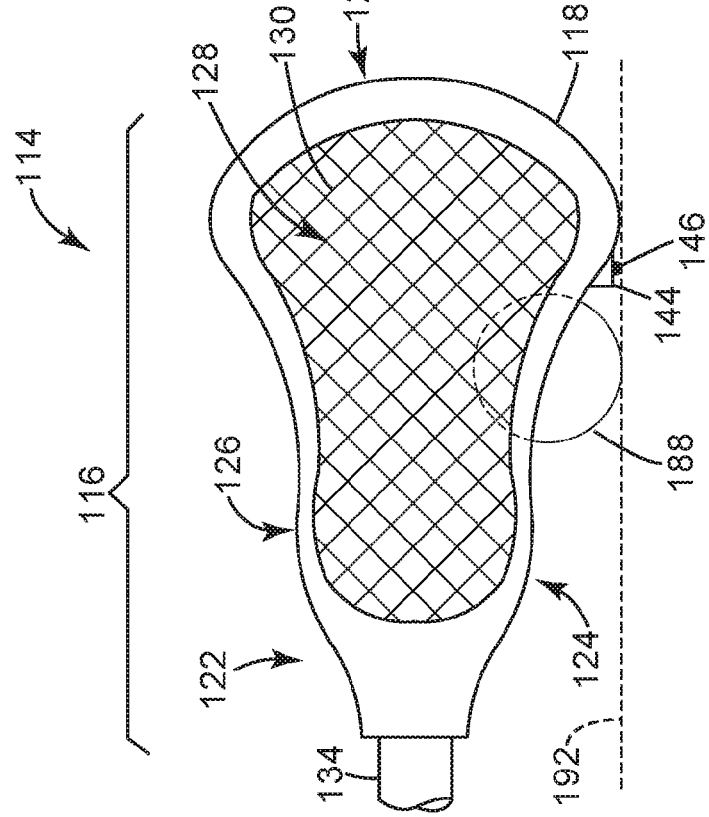

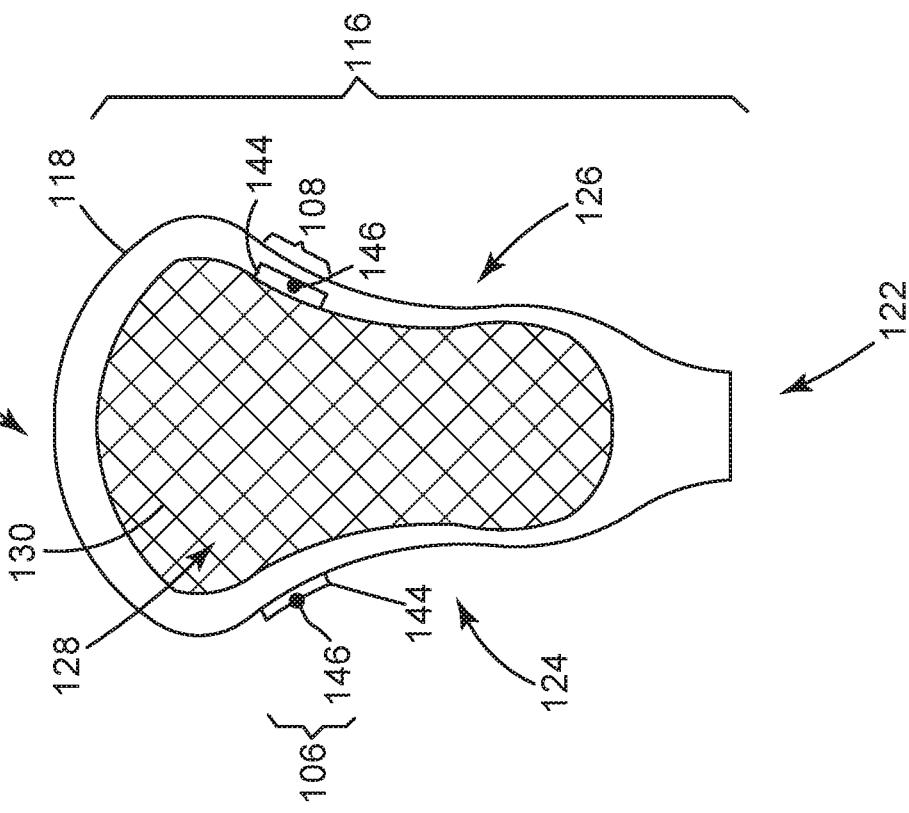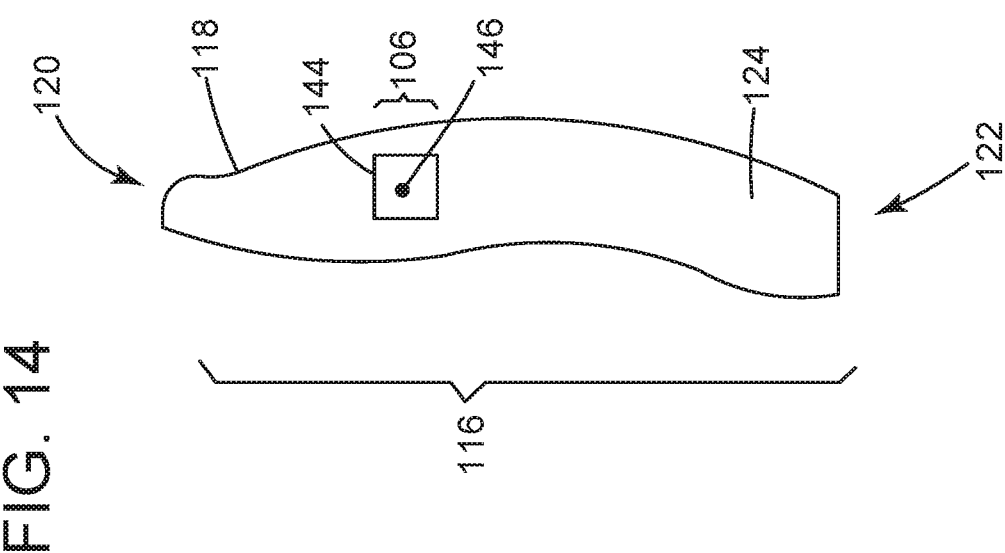

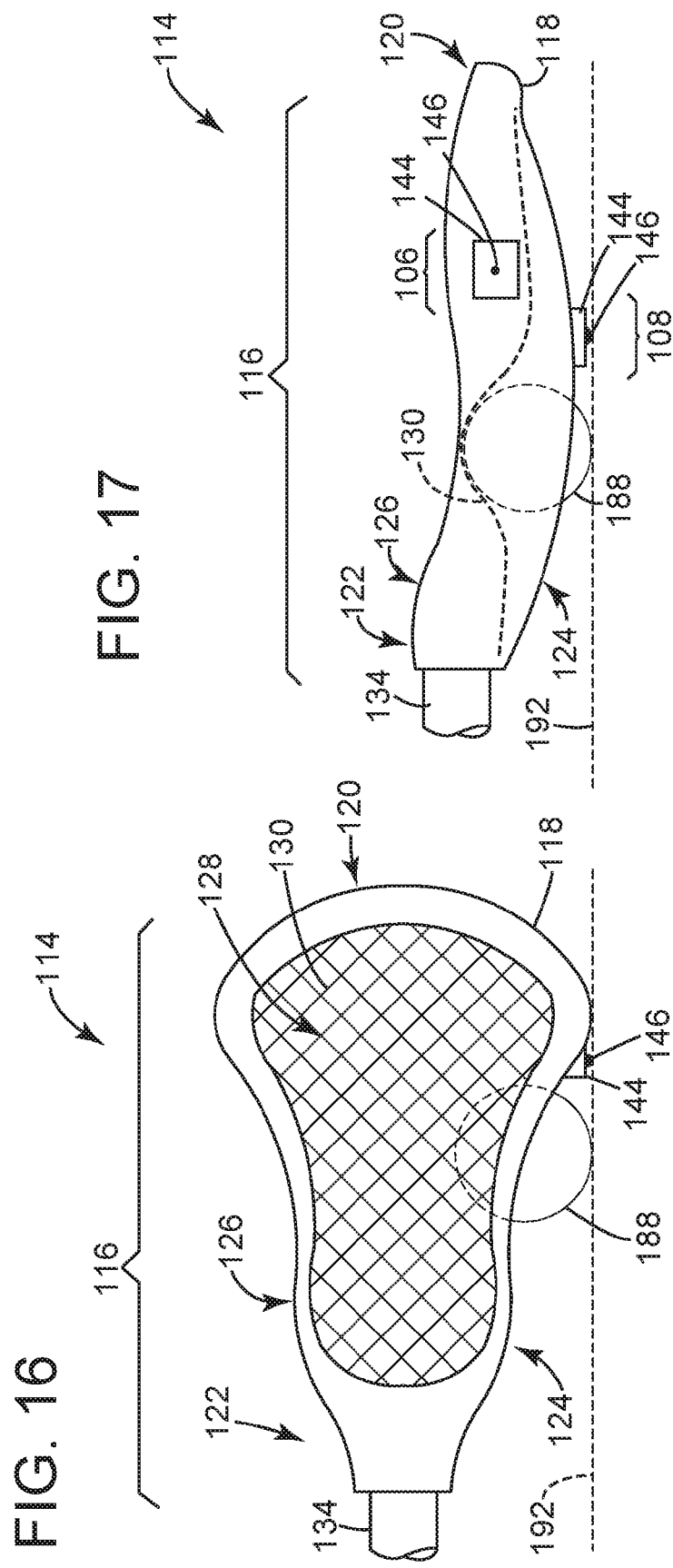

SPORTS TRAINING AID

CROSS-REFERENCE TO RELATED APPLICATIONS

This application claims the benefit of priority to U.S. Provisional Application Ser. No. 62/058,899, filed on Oct. 2, 2014, and entitled "LACROSSE TRAINING DEVICE." The content of this application is incorporated herein by reference in its entirety.

BACKGROUND

Lacrosse is a popular sport in North America and throughout the world. The sport requires participants to use sticks to carry, pass, and shoot a ball. Part of the sport includes a face-off that occurs periodically during play of the game. The face-off involves a player from each of the opposing teams. In executing the face-off, the players orient their sticks very close to one another. The referee places the ball between the sticks, steps away from the players, and instructs the players to remain, effectively, motionless until the referee issues a signal (e.g., blows a whistle) to restart play of the game. At the signal, the players move their sticks to attempt to gain control of the ball.

Players often exhibit several traits that facilitate success at the face-off. Although strength is important, it is often the case that the "winning" player is quicker and/or has a reaction time that allows him/her to more readily react to the signal from the referee. These traits allow the player to gain immediate advantage over the opposition. The player may, for example, move the stick in a manner that traps, or "clamps," the ball advantageously between the stick and the ground. In other cases, the player can move the stick in a manner that causes the ball to jettison from between the sticks into the path of an oncoming teammate.

SUMMARY

The subject matter disclosed herein relates to athletic training, with particular discussion about embodiments of a device for use to train athletes in the sport of lacrosse. This device can help a player improve quickness and/or reaction time at the face-off. In other implementations, the device may help the player to improve the ability to pass and catch the ball.

Some embodiments feature a training aid that can configure the lacrosse stick for different training programs. This training aid uses sensors to monitor locations on the stick. Each of the sensors can communicate with a controller that is configured to receive and process signals. In one implementation, the controller can relate the signals to movements to control the ball during the face-off and/or to operate the stick to project and control the ball.

BRIEF DESCRIPTION OF THE DRAWINGS

Reference is now made briefly to the accompanying drawings, in which:

FIG. 11 depicts an elevation view of the front of the lacrosse stick of FIG. 9 in a first position during a face-off;

FIG. 12 depicts an elevation view of the front of the lacrosse stick of FIG. 9 in a second position during a face-off;

FIG. 14 depicts an elevation view of the side of the lacrosse stick of FIG. 13;

FIG. 15 depicts an elevation view of the front of the lacrosse stick of FIG. 13;

FIG. 16 depicts an elevation view of the front of the lacrosse stick of FIG. 13 in a first position during a face-off;

FIG. 17 depicts an elevation view of the side of the lacrosse stick of FIG. 13 in a second position during a face-off.

Figure 1:
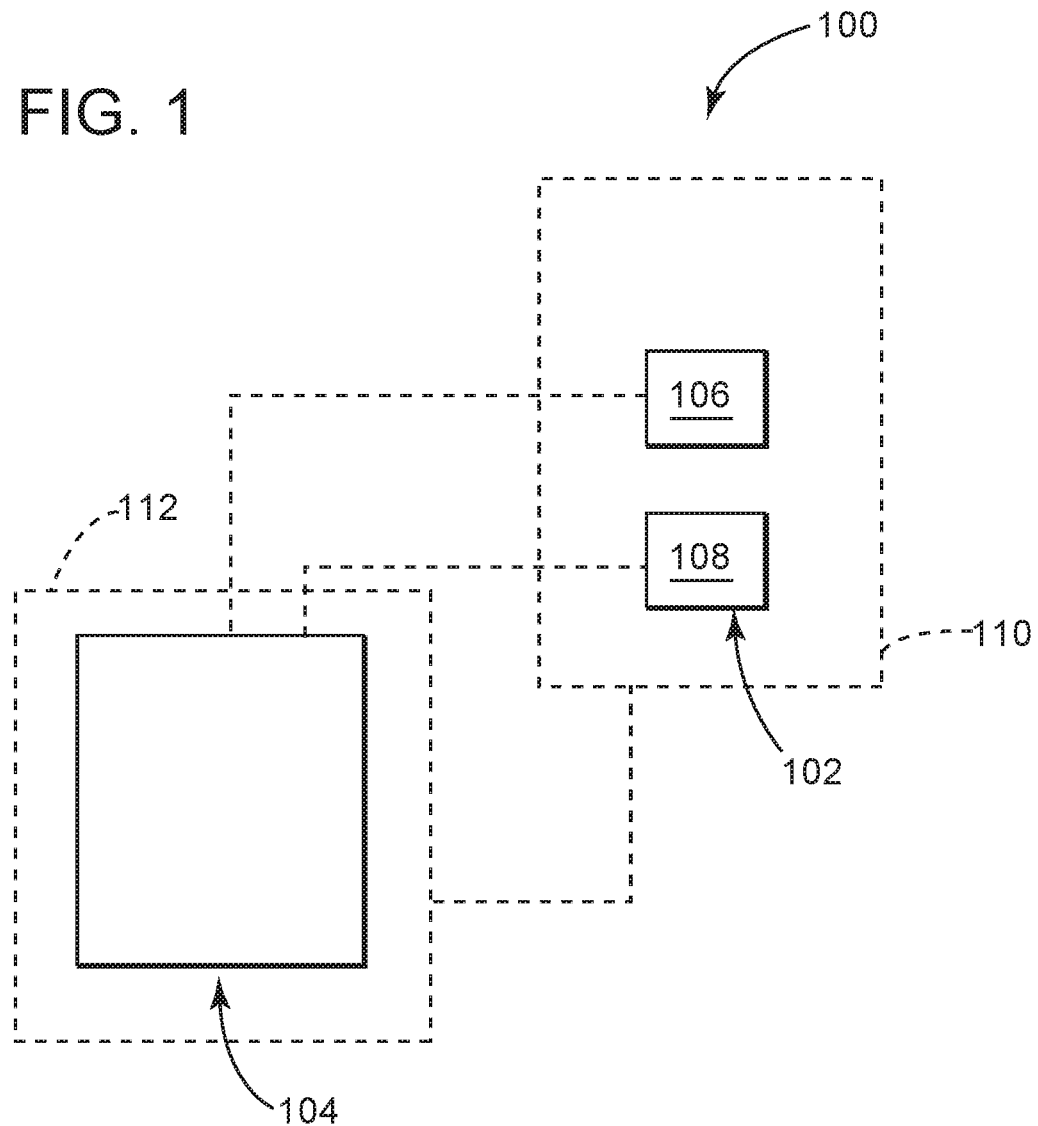
FIG. 1 depicts a schematic diagram of an exemplary embodiment of a sports device with a training aid for use by an athlete to improve and practice skills.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

This discussion describes embodiments of a sports device that a player can use to improve skills and coordination. The embodiments can take the form of a lacrosse stick, shown and described below, although other sports may have devices (e.g., hockey sticks, baseball bats, etc.) that could benefit from implementation of the concepts herein. In one implementation, the embodiments use sensors onboard the lacrosse stick to track actions that relate to skills that are essential to play of the game. The sensors can communicate with a controller that can operate among several training modes to allow a player to practice and develop these skills. The training modes impart a level of fun or contest into practice of these skills that may retain the player's interest during otherwise mundane, individual drills. Other embodiments are within the scope of the disclosed subject matter.

FIG. 1 illustrates a schematic diagram of an exemplary embodiment of a sports device 100 that is useful for play of an athletic game. The sports device 100 includes a training aid in the form of a sensor member 102 that couples with a control member 104. The members 102, 104 can communicate with one another to exchange signals (e.g., electronic signals). The sensor member 102 can include one or more sensors (e.g., a first sensor 106 and a second sensor 108). The sensors 106, 108 can reside on the sports device 100, for example, on a first part 110 of the sports device 100. The first part 110 can couple with a second part 112, which itself may house at least part of the control member 104, as desired. In use, the player can manipulate the second part 112 to move and/or operate the first part 110, preferably to interact with a ball (or puck) during play of the game.

In context of the sport of lacrosse, the sports device 100 can embody a stick that the player employs to catch and throw the ball. The parts 110, 112 can embody a head and a shaft of the stick, respectively. The head can be configured for the player to receive and carry the ball. The player holds onto the shaft to catch and throw the ball from the head. As noted herein, the player can also manipulate the shaft to capture the ball during the face-off.

The training aid can generate data that describes operation of the stick. For example, the sensors 106, 108 can attach to the stick so that the electronic signals correspond to movements of (or that relate to) the head. These movements may involve actions to pass and catch (or receive) the ball. The movements may also involve actions that would occur during the face-off in the game; for example, the actions can relate to a chopping or a clamping motion that the player uses to gain control of the ball.

The control member 104 can be configured to process signals from the sensors 106, 108. These configurations can administer one or more practice drills that the player can perform to improve their skills. In one implementation, the control member 104 can cause the training aid to execute various training modes that may call on the player to perform actions to actuate one or more of the sensors 106, 108. These actions may, for example, move the head among positions that are common during the face-off or, in other training modes, cause the ball to exit and enter the head as is common to passing and catching the ball, either between players or against a target (e.g., a wall, goal, etc).

The training aid may be configured to use the data from the sensors 106, 108 to quantify (or qualify) certain traits or characteristics of the player. Such configurations may utilize executable instructions (e.g., software, firmware) that configure the control member 104 to perform certain functions to count repetitions and/or to measure response time, quickness, accuracy, and like characteristics that may be important to evaluate the skill level of the player. In one implementation, the training aid may also be configured to store the data (or transmit the data for remote storage). This feature can aggregate data from a single individual or a collection of individuals (e.g., a team). Future analysis of the data may be helpful to collectively review how the individual or team performs during certain select drills, practice, or games.

Figure 2:
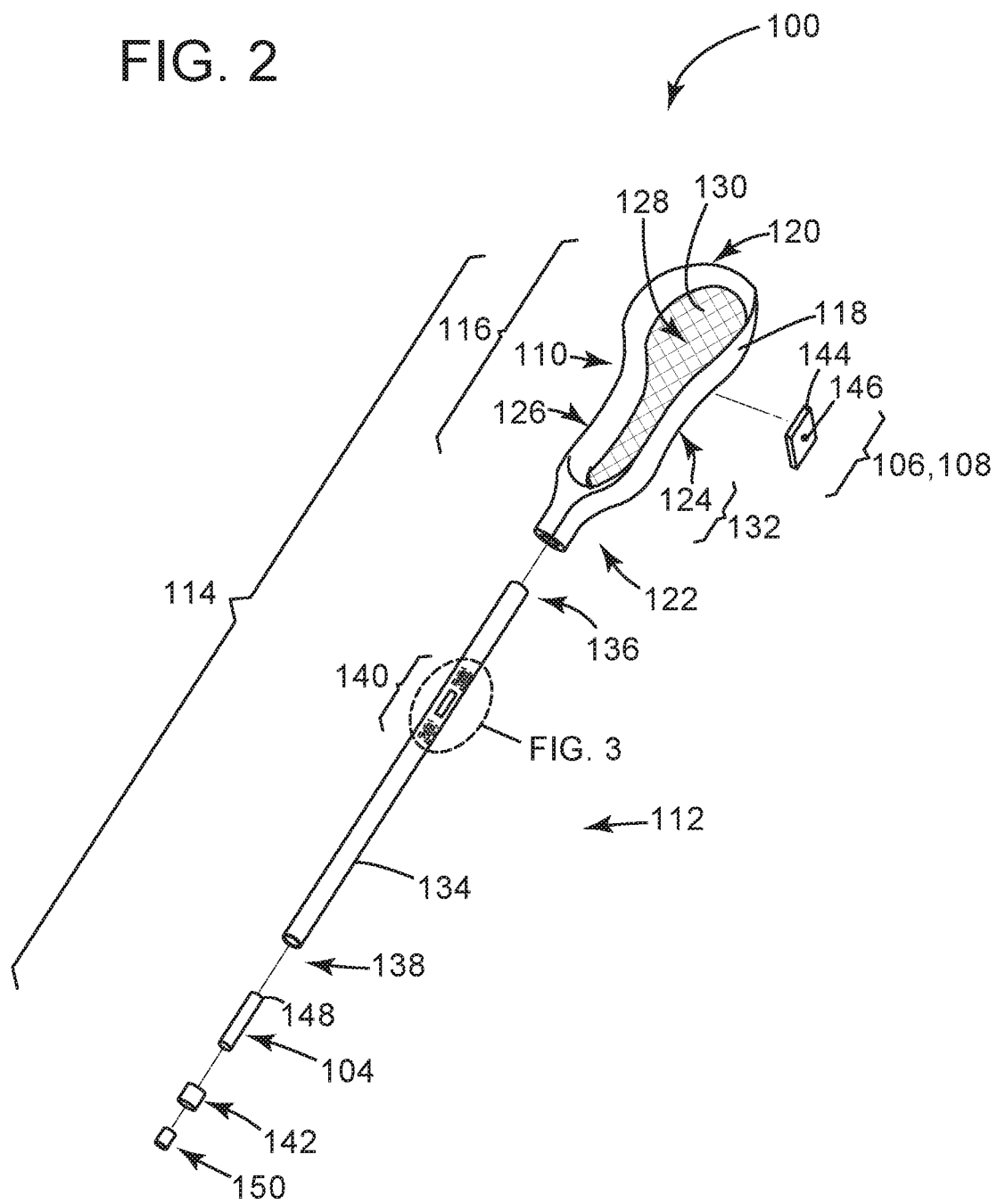
FIG. 2 depicts a perspective view of an example of the sports device in the form of a lacrosse stick in exploded form.

FIG. 2 illustrates a perspective view of the front of an example of the sports device 100 in exploded form. This example embodies a lacrosse stick 114 (also, "stick 114"). The first part 110 includes a head 116 with a frame 118 formed typically as a one-piece or unitary structure of moldable material (e.g., plastic). The frame 118 has a top 120, a bottom 122, and a pair of sidewalls (e.g., a first side wall 124 and a second sidewall 126). These parts collectively bound a central open region 128. The head 116 may include a netting 130 (also, "stringing 130") that spans the frame 118 to cover the open region 128. The netting 130 can comprise strings or fibers, often individually wound together or provided in a pre-formed webbing. This webbing can form a pocket area 132, typically encompassing the lower portion or half of the netting 130 in the head 116. The pocket area 132 is configured to receive and support a ball (not shown) in the open region 128 during use of the stick 114. At the bottom 122, the frame 118 secures to the second part 112 of the device 100, shown here as an elongate shaft 134 with ends (e.g., a first end 136 and a second end 138) and an interactive region 140 disposed therebetween. Examples of the elongate shaft 134 can form a cylinder that is hollow, either fully or partially. A cap 142 may be configured to couple with the second end 138 to cover the opening to the cylinder.

The training aid can couple with the head 116 and/or the elongate shaft 134 to outfit the lacrosse stick 114 for use among a plurality of different training modes. In one implementation, the first sensor 106 can have a carrier member 144 with a body that secures a sensing device 146 to the head 116. The sensing device 146 can embody any variety of devices that can generate electronic signals. These devices may operate (to generate the electronic signal) in response to changes in properties of light (e.g., photodiode, photoresistor, break beam sensors), magnetic field (e.g., proximity sensors, Hall effect sensors), and/or position (e.g., tilt switches, accelerometers). For simplicity, the sensing device 146 may also be mechanically activated (e.g., push-button, plunger-type sensors).

Construction of the body on the carrier member 144 can comport with the structure of the sensing device 146. The construction may utilize plastics and/or composites that are molded (e.g., injection mold) and/or cast, although it may also be possible to manufacture the body using any number of machining and production techniques. In one example, the head 116 may integrate the body of the carrier member 144, either in whole or in part, into its one-piece or unitary structure. Integrated designs may couple the sensing device 146 to be removeably replaceable from the unitary structure using openings and/or apertures to accommodate a snap fit or press-fit.

Turning back to FIG. 2, the control member 104 can couple with the sensors 106, 108 to exchange the electronic signals. The control member 104 may include a terminal device 148 and a switch member 150. Wires or a wiring harness may extend between the components of the training aid to carry the electronic signals. However, in certain configurations the components may be configured for use with appropriate wireless protocols (e.g., Bluetooth®). Examples of the terminal device 148 can embody a small board or like chip-set, typically using a number of discrete devices disposed on a substrate (e.g., printed circuit board (PCB), flexible circuit, etc.). Wireless connectivity may, however, allow for the sensors 106, 108 and/or the terminal device 148 to connect with a remote device (e.g., a smart phone, tablet, laptop, etc.). This feature can facilitate transfer of data for use, for example, in analysis and/or calculations that occur in an application (or app) onboard the remote device.

The terminal device 148 may reside on and/or inside the elongate shaft 134. This feature may be useful to accommodate wired connections that require wires that extend along, into, and/or through the cylinder and the structure of the head 116. In one implementation, the terminal device 148 can insert into either end 136, 138 of the cylinder to a position at or proximate the interactive region 140. Fasteners may be useful to penetrate through the material of the elongate shaft 134 and secure the terminal device 148 in this position. It may also be helpful to include adhesive and/or potting material in and/or around portions of the terminal device 148, either alone or to supplement the fasteners, as desired. In addition to securing the terminal device 148 at its location, these materials may protect against shock, vibration, and other forces the terminal device 148 may see during use of the lacrosse stick 114 to execute the training modes. Any wiring may extend through the cylinder to couple the sensors 106, 108 and the switch member 150 with the terminal device 148. On the head 116, the wires may couple with the frame 118 or, alternatively, the frame 118 may include features (e.g., channels, bores, openings) that are useful to route the wires in a way to avoid tangling and interference with use of the stick 114.

Actuation of the switch member 150 can allow the player to operate the training aid among the different training modes. The switch member 150 can embody a toggle, a push-button, and/or similarly configured implement. These devices can mount onto the lacrosse stick 114, preferably in a position that it would not interfere with grip and/or handling of the elongate shaft 134 by the player. In one implementation, the player can access the switch member 150 with the cap 142 disposed on the end 138 of the elongate shaft 134.

Figure 3:
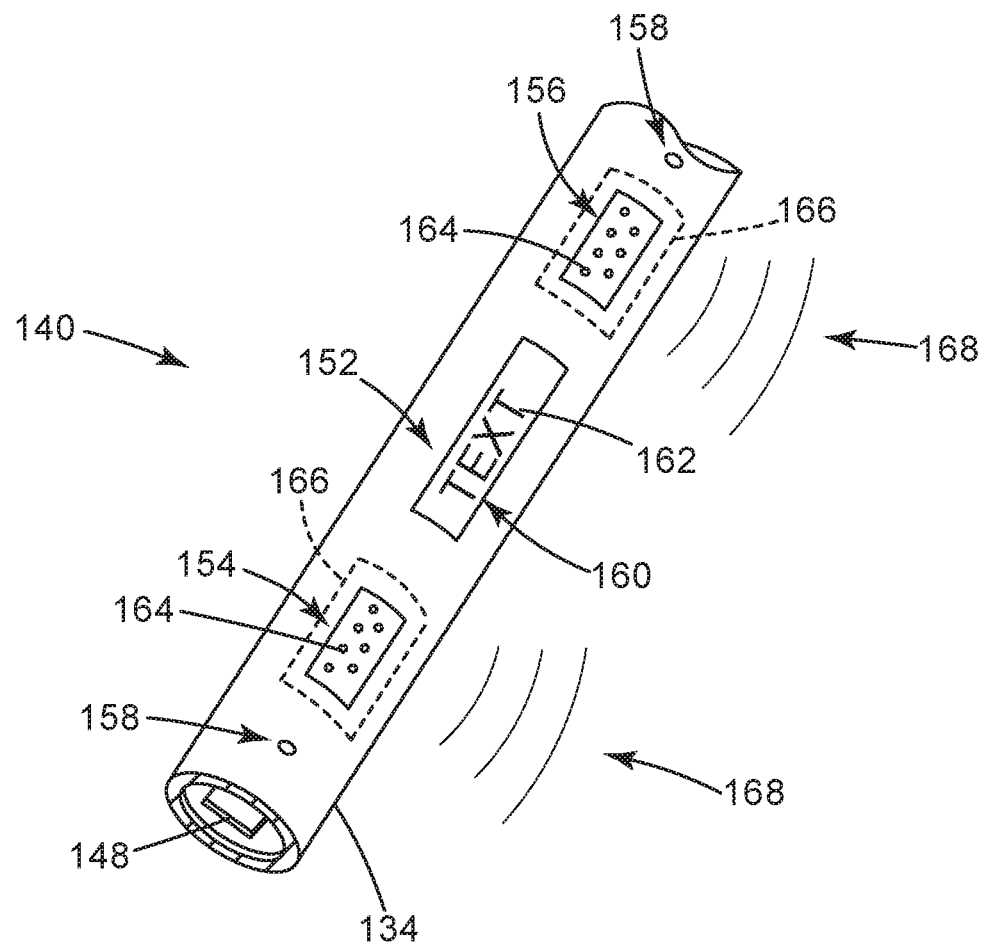
FIG. 3 depicts a detail view of the lacrosse stick of FIG. 2.

FIG. 3 illustrates a detail view of the example of the sports device 100 of FIG. 2 in assembled form. This view focuses on the interactive region 140. At a high level, the interactive region 140 can be configured for the training aid to provide a number of sensory indicators (e.g., visual, audio, tactile, etc.) to the player. These sensory indicators can alert the player to certain conditions or training modes of the training aid and to provide audio and visual instructions, among other features contemplated herein. In one implementation, the interactive region 140 includes a visual area 152 and one or more audio areas (e.g., a first audio area 154 and a second audio area 156). The interactive region 140 can also include one or more openings 158 to receive fasteners to secure the terminal device 148 in position in the elongate shaft 134.

Each of the areas 152, 154, 156 can form features integral with the material of the elongate shaft 134. These features may allow access to the hollow interior of the cylinder. Machining and other secondary processes (e.g., turning, die cut, stamping, etc.) may be helpful to form openings in the material of the elongate shaft 134. This disclosure does contemplate manufacture of the elongate shaft 134 using processes (e.g., extruding) to incorporate such openings, as desired.

The visual area 152 can form a window that exposes at least a portion of the terminal device 148. The portion of the terminal device 148 in the window may include a display 160 or other component. The display 160 can transmit a visual indicator 162 to the player. The visual indicator 162 may convey text information about operation of the training aid, although it is contemplated that LEDs, lights, and other devices may encode information as lights that blink in different patterns, change colors, etc. The information can identify the training mode, provide a counter, or convey other data and information that relates to the training mode. In use, the information on the display 160 may change in response to actuation of the switch member 150 (FIG. 2) and/or the sensors 106, 108 (FIGS. 1 and 2).

Referring back to FIG. 3, the areas 154, 156 can be configured to allow sound waves to escape the interior of the elongate shaft 134. This configuration may include one or more apertures 164 that penetrate the material thickness of the elongate shaft 134. In one implementation, the apertures 164 can expose one or more speakers 166 or other audio element on the terminal device 148. The speakers 166 can transmit an audio indicator 168 to the player. Examples of the audio indicator 168 can include voices, whistles, beeps, and like verbal and non-verbal sounds.

Figure 4:
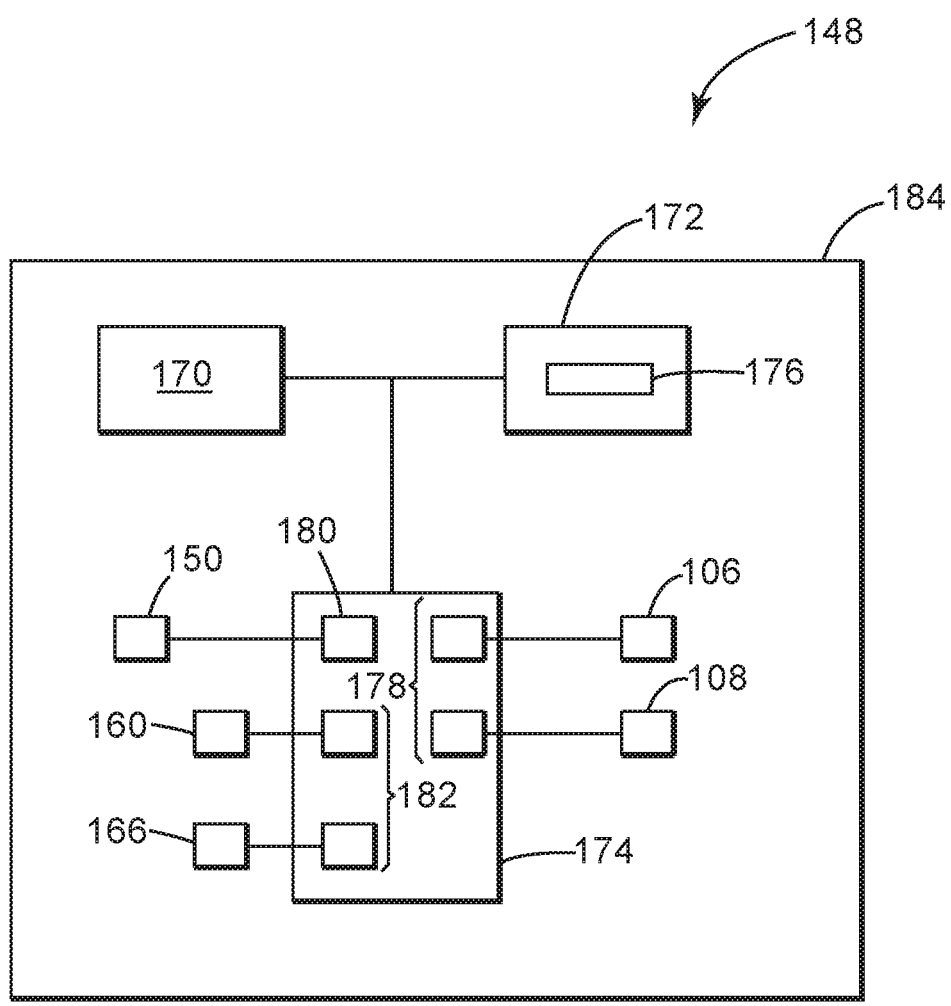
FIG. 4 depicts a schematic diagram of a wiring diagram for an example of a control member for use on the lacrosse stick of FIG. 2.

FIG. 4 depicts a schematic diagram of an example of the terminal device 148 that can cause the training aid to operate among the different training modes. This example may include a processor 170 that couples with a storage memory 172 and with a driver circuitry 174. The storage memory 172 can include executable instruction 176 that are configured to be executed by the processor 170 to cause operation of the training aid. The driver circuitry 174 may include individual circuitry to interact with various components of the training aid. This circuitry can include sensing circuitry 178 that couples with the sensors 106, 108 and switching circuitry 180 that couples with the switch member 150. To formulate the audio and/or visual indicators, the terminal device 148 may include one or more audio/visual circuitry 182 that couples with the display 160 and the speaker 166. Collectively, the components of the terminal device 148 may reside on one or more substrates 184 that is sized and configured to fit into the hollow interior of the elongate shaft 134 (FIG. 2) as noted herein. A power supply may also be included, either disposed on the substrate 184 or in and/or on the elongate shaft 134 (FIG. 2). Examples of the power supply can include batteries and similar storage devices. In one implementation, the lacrosse stick 114 (FIG. 2) may be equipped with solar cells to maintain and/or recharge the batteries, as needed.

Figure 5:
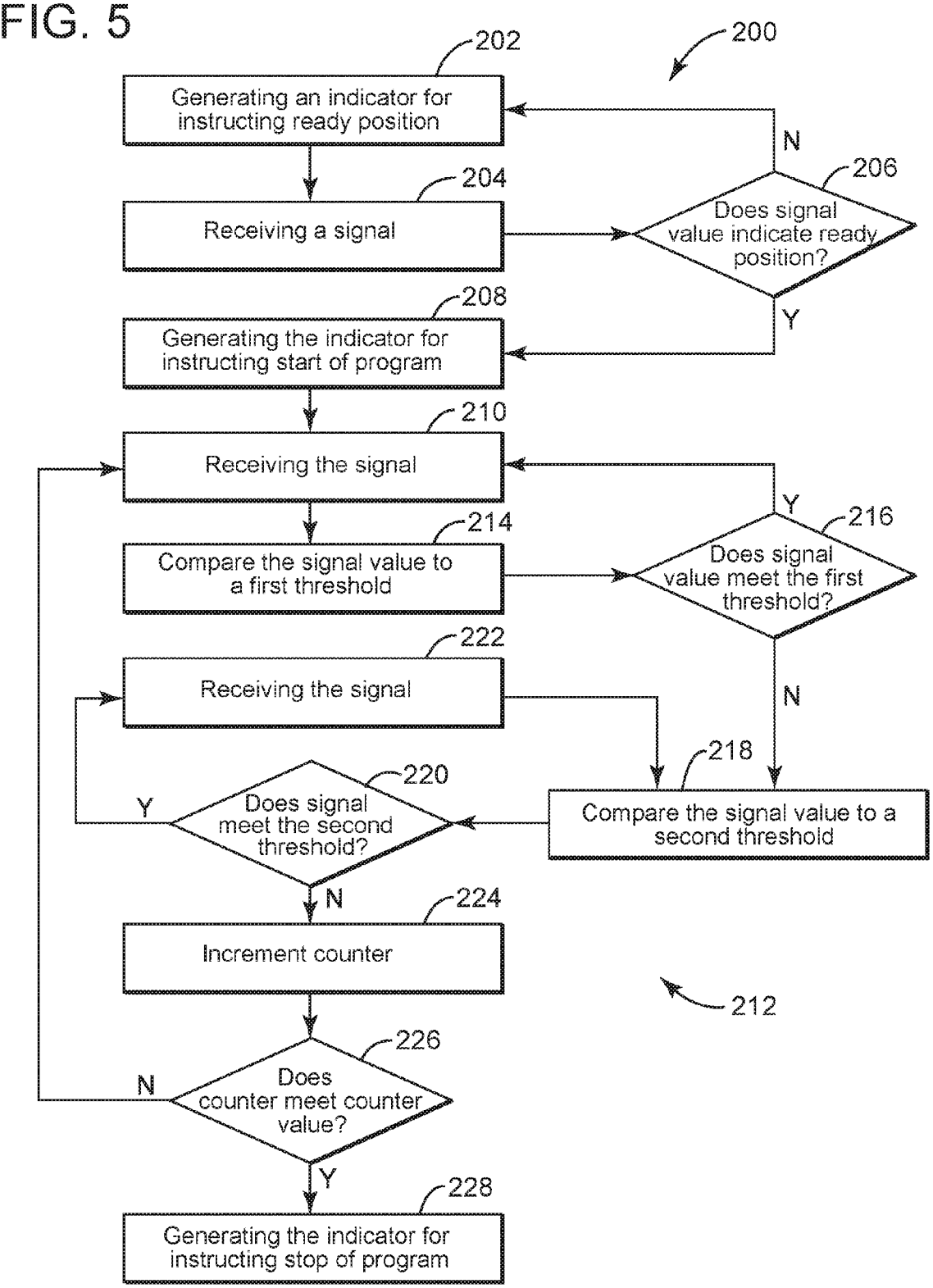
FIG. 5 depicts a flow diagram of an exemplary embodiment of a method.

FIG. 5 shows a flow diagram of an exemplary embodiment of a method 200 to cause the training aid to operate in one of the training modes contemplated herein. This diagram outlines stages that may be coded as one or more executable instructions 176 (FIG. 4) for one or more computer-implemented methods and/or programs. The executable instructions 176 (FIG. 4) may be stored on the storage memory 172 (FIG. 4) and/or otherwise accessible to the processor 170 (FIG. 4). For example, the processor 170 (FIG. 4) may be configured to execute these executable instructions to instruct the player to practice passing, catching, and face-off skills. The stages in these methods can be altered, combined, omitted, and/or rearranged in some embodiments.

The method 200 can include, at stage 202, generating an indicator for instructing a first position for the lacrosse stick. The method 200 can also include, at stage 204, receiving a signal and, at stage 206, determining whether the signal has a value (also, "signal value") that indicates the first or "ready" position. This ready position may correspond with one side of the head 116 in contact with the ground or, in one example, with the ball in position in the pocket area 132. If negative, then the method 200 can return to stage 202 and, effectively, wait for the player to orient the lacrosse stick in the proper position to begin the program or drill. It may be advantageous for the method 200 to regenerate the indicator for instructing the ready position or, on other examples, simply maintain some default condition or setting as between stages 202, 204, 206, until the player orients the lacrosse stick 114 in the proper position to begin the program or drill. Once the signal value shows the lacrosse stick 114 in the ready position, then the method 200 can continue, at stage 208, generating the indicator for instructing the start of the program (or drill). This indicator may embody a whistle typical of game play. In other example, the indicator may include audible commands, alone or in combination, like "READY," "SET," and the like.

The method 200 can continue to administer the training program or drill with the player in the ready position. At stage 210, the method 200 can include receiving the signal (from the sensors 106, 108), and, at stage 212, comparing the signal value to one or more threshold criteria. Examples of the threshold criteria may specify a signal value that indicates a required status and/or a change in status of the lacrosse stick 114. The criteria may correspond with a state and/or a change in state of the sensors 106, 108. The state may correspond with the actions of the player. In one example, the action will cause the ball to exit and/or return to the lacrosse stick 114, consistent with manipulating the head 116 to pass and catch the ball. The action can also change the position of the lacrosse stick 114 from the first position to a second or "action" position, as would be required during the faceoff.

At stage 212, the method 200 can include one or more stages that embody processes to monitor and correlate the state of the sensors 106, 108 with the actions of the player. These processes may use thresholds (also, "threshold values"). For binary operations, the threshold may correspond with voltage, current, and/or like properties of signals that originate from the sensing device 146. In one implementation, the sensing device 146 may provide a high voltage (e.g., 5V) or low voltage (e.g., 0V) based on the actuation and/or position. These voltages can be useful to track the movement of the head 116 during a face-off or catch-and-release of the ball from the pocket area 132, as noted more below. In one implementation, the sensing device 146 may provide an indication of orientation of the head 116 relative to a surface (e.g., a playing surface or field). Such indication may correspond with use of an accelerometer and/or tilt switch that is disposed on the head 116 and/or the stick 114, generally.

Referring back to FIG. 5, the method 200 can include, at stage 214, comparing the signal value to a first threshold and, at stage 216, determining whether the signal value meets the first threshold. This first threshold could be assigned one of the high or low voltage values. In one example, if the signal value meets the first threshold, then the method 200 may return to stage 210. If the signal value does not meet the first threshold, then the method 200 continues, at stage 218, comparing the signal value to a second threshold and, at stage 220, determining whether the signal value meets the second threshold. In one implementation, the second threshold is different from the first threshold, e.g., if the first threshold is assigned the high voltage value then the second threshold is assigned the low voltage value. In one example, if the signal value meets the second threshold, then the method 200 continues at stage 222, receiving the signal. This operation may occur as the player transitions the stick 114 from the ready position to the action position during a face-off drill. If the signal value does not meet the second threshold, then the method 200 continues, at stage 224, incrementing a counter and, at stage 226, determining whether the counter meets a pre-determined counter value. Failure of the counter to meet the counter value will send the method 200 back to stage 210 and the monitoring loop begins again at stage 212. On the other hand, if the counter meets the counter value, the method 200 can continue at stage 228, generating the indicator for instructing stoppage of the program.

The discussion now turns to review several exemplary configurations for the training aid on the lacrosse stick 114. Other configurations may reasonably fit with the scope and spirit of this disclosure. To this end, each configuration may define a position for one or both of the sensor members 106, 108 on the head 116. In turn, actuation of the stick 114 may cause the sensor members 106, 108 to change state and/or to generate electronic signals that correspond with different locations of the head 116. The terminal device 148 can use and/or process the electronic signals for these different locations to administer different training modes and, thus, allow the player to practice different skills.

Figure 6:
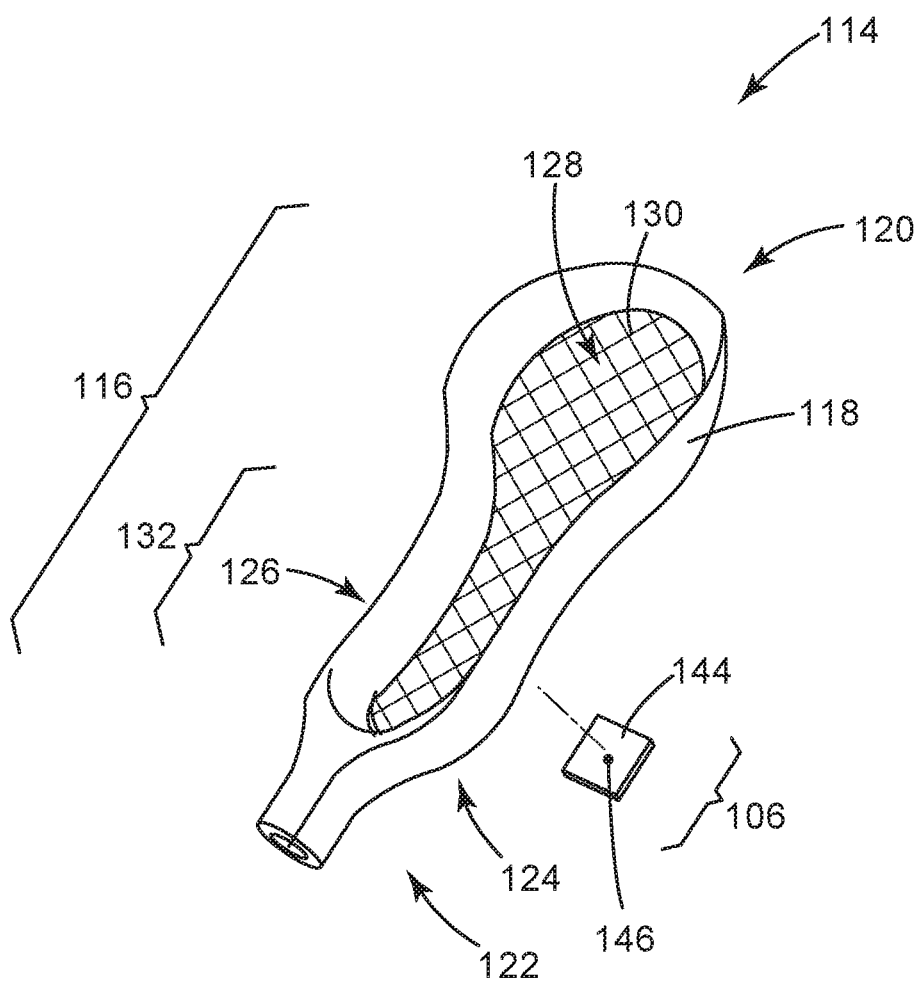
FIG. 6 depicts a perspective view of an example of the lacrosse stick of FIG. 2 with the training aid in a first configuration.
Figure 7:
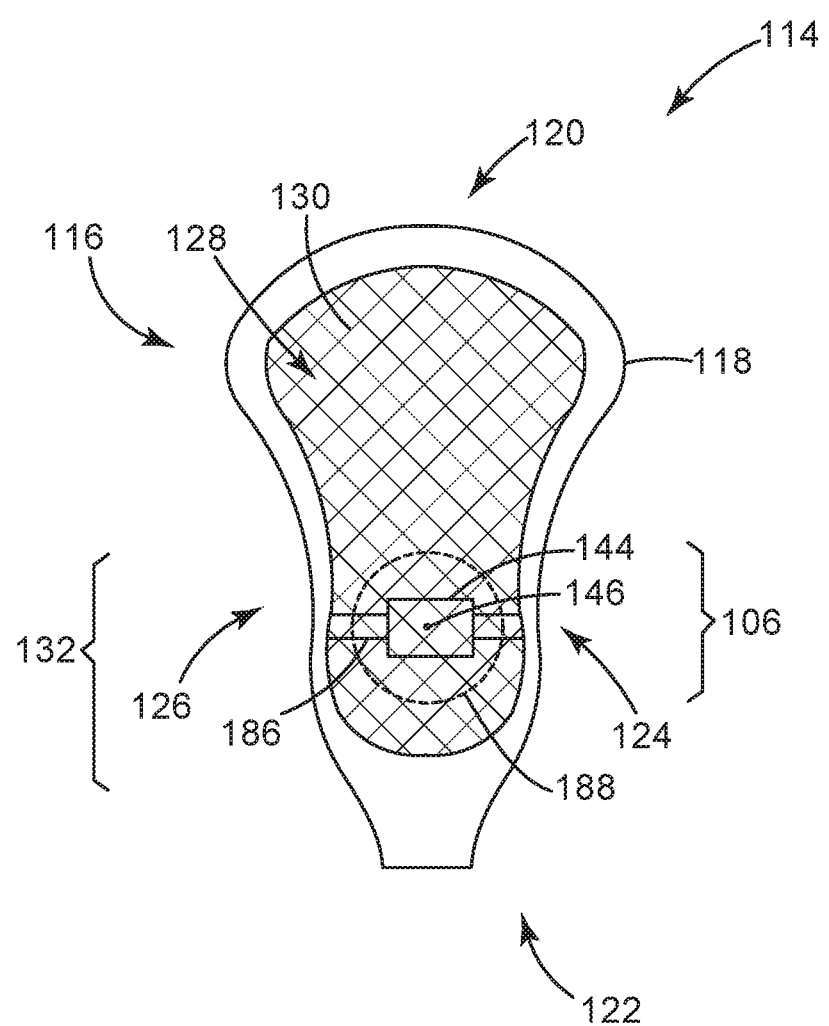
FIG. 7 depicts an elevation view of the front of the lacrosse stick of FIG. 6.

FIGS. 6 and 7 illustrate an example of the lacrosse stick 114 in partially-assembled form to focus on the head 116. In each diagram, the training aid has a first configuration. FIG. 6 is a perspective view of the lacrosse stick 114. FIG. 7 is an elevation view of the front of the lacrosse stick 114.

This first configuration incorporates at least one sensor (e.g., the first sensor 106) at and/or near the pocket area 132 of the netting 130. The carrier member 144 may include a strap member 186 that positions the body of the carrier member 144 so that the sensing device 146 can interact with a ball, shown in phantom lines identified by the numeral 188. Examples of the strap member 186 can comprise material that is pliable, flexible, and/or resilient, although stiffer materials (e.g., plastics) may also suffice. The material can be sized to span across the frame 118 to couple with either sidewall 124, 126. Snaps, hooks, and like components on the strap member 186 and/or the frame 118 may be useful to securely attach the material in position on the head 116 and to maintain the sensing device 146 in position in the pocket area 132.

Figure 8:
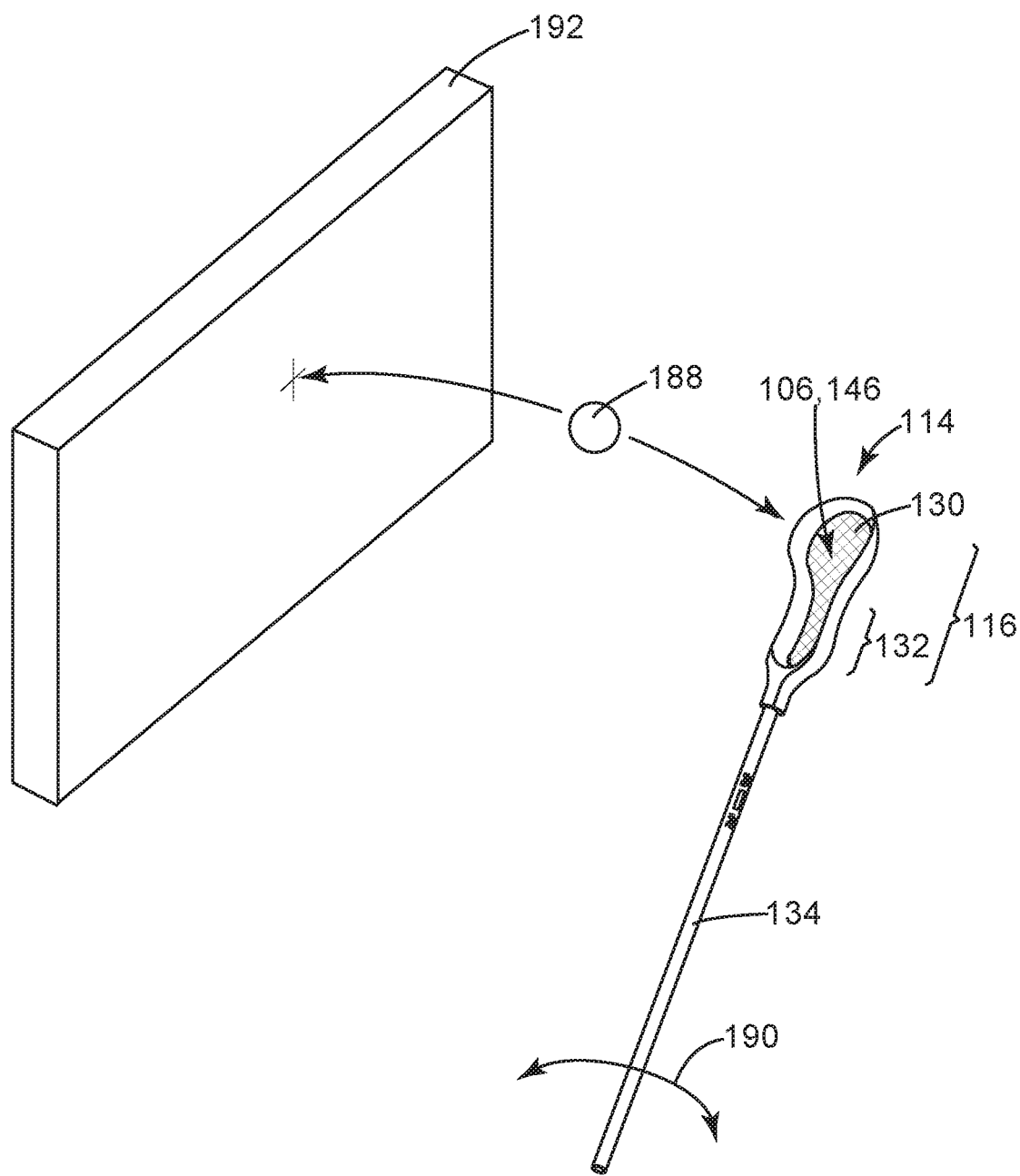
FIG. 8 depicts a schematic diagram of a use case for the lacrosse stick of FIG. 6.

FIG. 8 depicts a use case for the first configuration of the training aid on the lacrosse stick 114. The first sensor 106 can indicate the presence (and/or absence) of the ball 188 in the pocket area 132 of the netting 130 of the head 116. The terminal device 148 (FIGS. 2, 3, and 4) can be configured to monitor electronic signals from the sensing device 146. These signals may originate in response to interaction between the ball 188 and the sensing device 146.

With reference also to FIG. 5, the ball 188 may set the state of the sensing device 146 (e.g., at the high voltage value). The resulting electronic signal corresponds with the presence of the ball 188 in the pocket area 132. The player can advance the ball 188 out of the pocket area 132 using a throwing motion, identified generally by the arrow 190. This motion causes the ball 188 to exit the pocket area 132 and, in turn, change the state of the sensing device 146 (e.g., from the high voltage value to the low voltage value). The resulting electronic signal (or absence thereof) may correspond with the absence of the ball 188 in the pocket area 132. In one example, the ball 188 may strike a target 192 like a wall during individual practice. For groups of players, the ball 188 may travel between players, one or more of which may be using an example of the lacrosse stick 114 equipped with the training aid as contemplated herein. The ball 188 may return in the direction of the player so that the player can catch the ball 188 in the head 116 and, in turn, change the state of the sensing device 146 (e.g., from the low voltage value to the high voltage value). The resulting electronic signal may correspond with the return of the ball 188 in the pocket area 132. In one training mode, the training aid may increment the counter each time the ball enters and/or exits the head 116, and, where applicable, give the player indications to stop after a certain number of "catches" or "passes."

Figure 9:
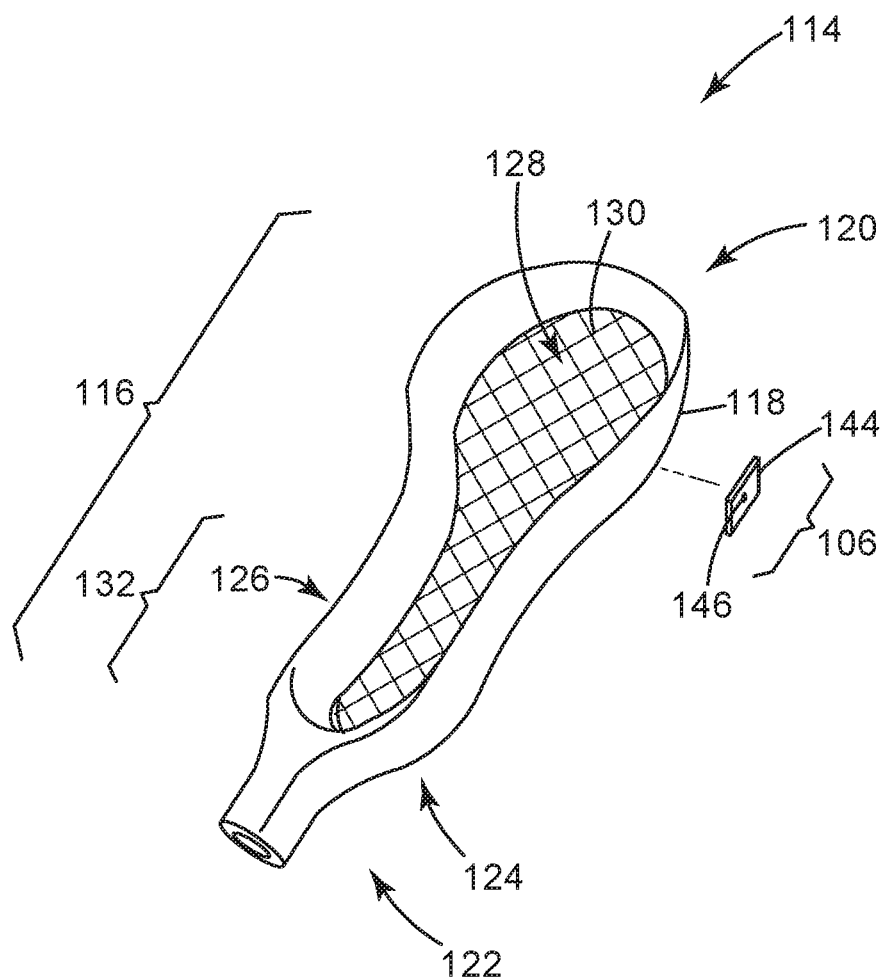
FIG. 9 depicts a perspective view of an example of the lacrosse stick of FIG. 2 with the training aid in a second configuration.
Figure 10:
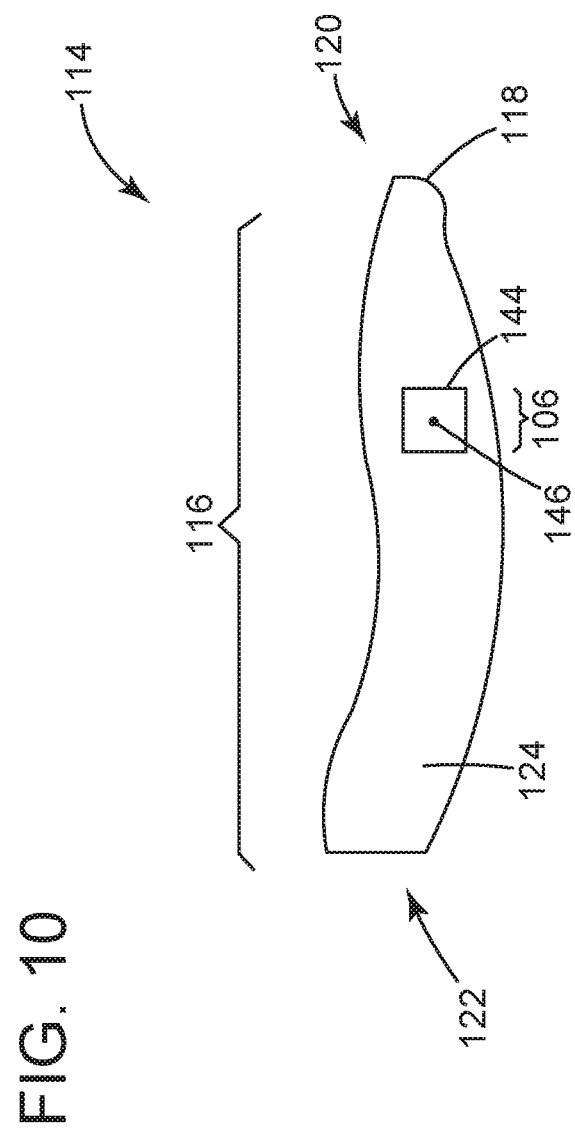
FIG. 10 depicts an elevation view of the side of the lacrosse stick of FIG. 9.

FIGS. 9 and 10 illustrate an example of the lacrosse stick 114 in partially-assembled form to focus on the head 116. In each diagram, the training aid has a second configuration. This second configuration incorporates the first sensor 106 on one of the sidewalls, namely the first sidewall 124. In this position, the sensing device 146 can interact with surfaces on or proximate the side of the frame 118 during the training mode.

FIGS. 11 and 12 depict a use case for the second configuration of the training aid on the lacrosse stick 114. FIG. 11 is an elevation view of the front of the lacrosse stick 114 with the ball 188 in the background and behind the head 116. The head 116 resides in the ready position with the side of the frame 118 in contact with (and/or proximate and/or in close proximity to) the target, for example, the ground as generally identified by phantom line identified by the numeral 192. FIG. 12 is also an elevation view of the front of the lacrosse stick 114, but with the ball 188 in the foreground and in front of the head 116. The head 116 resides in the action position, preferably spaced forward (into the diagram) away from the ready position.

The second configuration is useful for the player to practice "chopping" motions in face-offs. This motion requires the player to lift the head 116 from the ready position and over the ball 188 to the action position. The terminal device 148 (FIGS. 2, 3, and 4) can use the state of sensing device 146 (and the resulting electronic signal) to monitor (and/or, also, quantify) the time that the player requires to move the head 116 between face-off positions, namely, the first or ready position and a second or action position.

With reference also to FIG. 5, the ready position sets the state of the sensing device 146 (e.g., at the high voltage value) so that the resulting electronic signal effectively indicates that sensing device 146 is depressed (or actuated). The state may also indicate the orientation of the head 116 relative to the ground 192 for implementations that use accelerometers and like position and/or orientation sensitive devices. Movement of the head 116 can change the state of the sensing device 146. In one implementation, the player can lift the head 116 off of the ground 192, releasing the sensing device 146 to change the state of the sensing device 146 (e.g., from the high voltage value to the low voltage value). This action may occur as the player changes between the ready position and the action position. The action position changes the state of the sensing device 146 (e.g., from the low voltage value to the high voltage value) so that the resulting signal corresponds with the action position of the head 116. In one training mode, the training aid may increment the counter each time the player "chops" and, where applicable, give the player indications to stop after a certain number of "chops."

Figure 13:
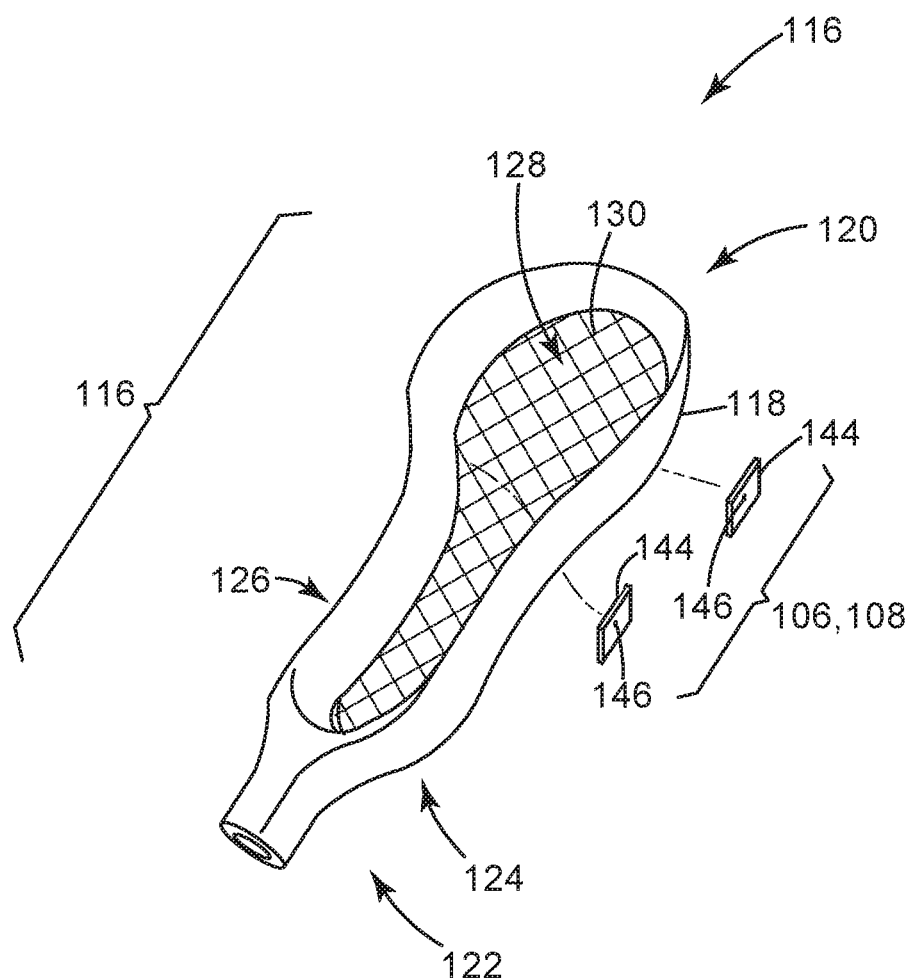
FIG. 13 depicts a perspective view of an example of the lacrosse stick of FIG. 2 with the training aid in a third configuration.

FIGS. 13, 14, and 15 depict an example of the lacrosse stick 114 in partially-assembled form to focus on the head 116. In each diagram, the training aid has a third configuration. FIG. 13 is a perspective view of the lacrosse stick 114. FIG. 14 is an elevation view of the side of the lacrosse stick 114. FIG. 15 is an elevation view of the back of the lacrosse stick 114.

The third configuration can incorporate the first sensor 106 and the second sensor 108, one each disposed on opposite sidewalls 124, 126, respectively. As shown in FIG. 14, the first sensor 106 can couple with the first sidewall 124, preferably positioning the sensing device 146 for contact on the side of the frame 118. FIG. 15 depicts one example in which the second sensor 108 couples with the second sidewall 126 to position the sensing device 146 for contact on or proximate the back of the frame 118.

FIGS. 16 and 17 depict a use case for the third configuration of the training aid on the lacrosse stick 114. FIG. 16 is an elevation view of the side of the lacrosse stick 114 with the ball 188 in the background and behind the head 116. FIG. 17 is an elevation view of the side of the lacrosse stick 114 with the ball 188 also in the background and captured in the frame 118 of the head 116.

The third configuration is useful for the player to practice "clamping" motions in face-offs. This motion requires the player to rotate the head 116 from the ready position to the action position. The terminal device 148 (FIGS. 2, 3, and 4) can use the state of sensing device 146 (and the resulting electronic signal) to monitor (and/or, also, quantify) the time that the player requires to move the head 116 between face-off positions, namely, the first or ready position and a second or action position.

With reference to FIG. 5, the ready position sets the state of the sensing device 146 for each of the first sensor 106 (e.g., at the high voltage value) and the second sensor 108 (e.g., at the low voltage value). The state may also indicate the orientation of the head 116 relative to the ground 192 for implementations that use accelerometers and like position and/or orientation sensitive devices. Movement of the head 116 can change the state of both of the sensing device 146. In one implementation, the player can rotate the head 116 forward (into the diagram). Rotation can move the side of the frame 118 off of the ground 192, releasing the sensing device 146 of the first sensor 106 to change the state of the sensing device 146 (e.g., from the high voltage value to the low voltage value). Travel of the head 116 to the action position can change the state of the sensing device 146 on the second sensor 108 (e.g., from the low voltage value to the high voltage value) so that the resulting signals from sensors 106, 108 correspond with the action position of the head 116. In one training mode, the training aid may increment the counter each time the player "clamps" and, where applicable, give the player indications to stop after a certain number of "clamps."

Figure 18:
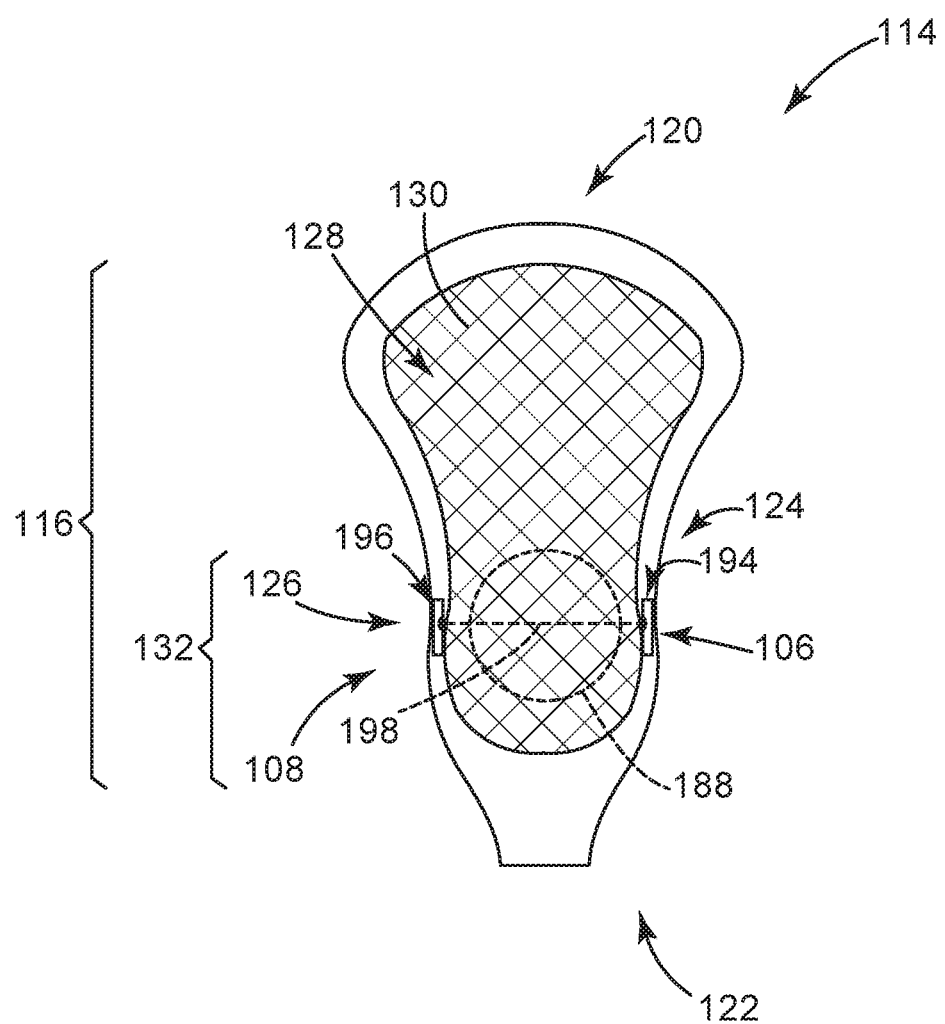
FIG. 18 depicts an elevation view of the front of an example of the lacrosse stick of FIG. 2 with the training aid in a fourth configuration.

FIG. 18 depicts an example of the lacrosse stick 114 in partially-assembled form to focus on the head 116. In this diagram, the training aid has a fourth configuration that incorporates the first sensor 106 and the second sensor 108, one each disposed on opposite sidewalls 124, 126, respectively. The sensors 106, 108 are also located proximate the pocket area 132. Examples of the sensing device 146 for the sensors 106, 108 can embody an optical or "break beam" sensor, often using an emitter 194 and a detector 196 that forms a beam 198. In operation, the fourth configuration can detect the absence and/or presence of the ball 188 in the pocket area 132 as the player manipulates the stick to eject and receive the ball in the head 116.

With reference also to FIG. 5, the detector 196 may set the state of the break beam sensor (e.g., at the high voltage value) when it can receive the beam 198 from the emitter 194. The resulting electronic signal corresponds with the presence of the ball 188 in the pocket area 132. The player can advance the ball 188 out of the pocket area 132 using the throwing motion. This motion causes the ball 188 to exit the pocket area 132 and, in turn, pass through the beam 198. In this way, the ball 188 may obscure the beam 198 from the detector 196, which can change the state of the break beam sensor (e.g., from the high voltage value to the low voltage value). After the ball passes through the beam 198, the detector 196 may receive the beam 198 and change the state of the break beam sensor (e.g., from the low voltage value to the high voltage value). The resulting electronic signal (or absence thereof) may correspond with the absence of the ball 188 in the pocket area 132. On return, the player can catch the ball 188 in the head 116. This action may cause the ball 188 to pass through the beam 198 and, in turn, change the state of the break beam sensor (e.g., from the high voltage value to the low voltage value and then back the high voltage value). The resulting electronic signal may correspond with the return of the ball 188 in the pocket area 132.

In one training mode, the training aid may increment the counter each time the ball enters and/or exits the head 116, and, where applicable, give the player indications to stop after a certain number of "catches" or "passes."

In view of the foregoing, the embodiments described herein offer players a chance to improve skills through repetitive, yet fun, drills and training exercises. These embodiments coordinate movements of the lacrosse stick with sensors that can exhibit definitive changes in state (e.g., high-low, low-high, on-off, off-on, proximity, orientation etc.). Such configurations may be particular useful for individual training on face-off skills, effectively eliminating the need for a partner or second individual with which to perform the drills.

Nominally, one or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). Exemplary circuits of this type may include discrete elements such as resistors, transistors, diodes, switches, and capacitors. Examples of a processor include microprocessors and other logic devices such as field programmable gate arrays ("FPGAs") and application specific integrated circuits ("ASICs"). Memory can include volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lacrosse stick, comprising:
   a head with a frame that forms a central open region;
   a netting that couples with the frame to cover the central open region and to form a pocket area, wherein the netting flexes relative to the frame so as to allow a majority of a ball to pass through the frame to enter and exit the pocket area;
   a sensor member disposed on the head to indicate presence or absence of the ball in the pocket area; and
   a control member coupled with the sensor member,
   wherein the control member is configured to operate in a training mode that causes the control member to associate a change in state of the sensor member with presence or absence of the ball in the pocket area.

2. The lacrosse stick of claim 1, wherein the sensor member is located in the central open region and in position in the pocket area to change state in response to interaction with the ball.

3. The lacrosse stick of claim 1, wherein the sensor member forms a beam that extends across at least part of the central open region so that the ball passes through the beam to enter and exit the pocket area on the frame.

4. The lacrosse stick of claim 1, further comprising an elongate shaft that couples with the head, wherein the control member is disposed inside of the elongate shaft.

5. The lacrosse stick of claim 4, wherein the control member comprises a display disposed at an opening in the elongate shaft.

6. The lacrosse stick of claim 5, wherein the control member is configured to generate a visual indicator on the display that describes the training mode.

7. The lacrosse stick of claim 4, wherein the control member comprises speakers disposed proximate apertures in the elongate shaft, wherein the apertures allow sounds waves to escape from inside of the elongate shaft.

8. The lacrosse stick of claim 7, wherein the control member is configured to generate an audio indicator from the speakers.

9. The lacrosse stick of claim 1, wherein the training mode further causes the control member to,
   generate a first indicator that starts the training mode;
   increment a value for a counter in response to the change in state of the sensor member; and generate a second indicator that stops the training mode in response to the value of the counter.

10. The lacrosse stick of claim 1, wherein the training mode further causes the control member to,
generate a first indicator that starts the training mode;
increment a value for a counter; and
generate a second indicator that stops the training mode in response to the value of the counter.

11. A lacrosse stick, comprising:
a head with a frame having a top, a bottom, and sidewalls that, collectively, bound a central open region;
a netting that couples with the frame to cover the central open region and to form a pocket area, wherein the netting flexes relative to the frame so as to allow a majority of a ball to pass through the frame to enter and exit the pocket area;
a sensor member disposed on the head, the sensor member comprising a first sensor and a second sensor, one each coupled to opposite sidewalls, and
a control member coupled with the sensor member,
wherein the control member is configured to operate in a training mode that causes the control member to associate a change in state of the sensor member with movement of the head, and
wherein the change in state corresponds with movement of the frame to contact the frame against a surface.

12. The lacrosse stick of claim 11, wherein the change in state corresponds with contact of one of the sidewalls of the frame with the surface.

13. The lacrosse stick of claim 11, wherein the first sensor and the second sensor are in position on the sidewalls so that the change of state corresponds with contact of a side of the frame and a back of the frame with the surface.

14. The lacrosse stick of claim 11, further comprising an elongate shaft that couples with the head, wherein the control member is disposed inside of the elongate shaft.

15. The lacrosse stick of claim 14, wherein the control member comprises a display disposed at an opening in the elongate shaft.

16. The lacrosse stick of claim 15, wherein the control member is configured to generate a visual indicator on the display.

17. The lacrosse stick of claim 15, wherein the control member is configured to generate a visual indicator from the speakers.

18. The lacrosse stick of claim 14, wherein the control member comprises speakers disposed proximate apertures in the elongate shaft, wherein the apertures allow sounds waves to escape from inside of the elongate shaft.

19. The lacrosse stick of claim 11, wherein the training mode further causes the control member to,
generate a first indicator that starts the training mode;
increment a value for a counter in response to the change in state of the first sensor; and
generate a second indicator that stops the training mode in response to the value of the counter.

20. The lacrosse stick of claim 11, wherein the training mode further causes the control member to,
generate a first indicator that starts the training mode;
increment a value for a counter; and
generate a second indicator that stops the training mode in response to the value of the counter.

21. A method, comprising:
on a lacrosse stick with a head and shaft:
providing netting to cover a central open region on the head, the netting forming a pocket area, wherein the netting flexes so as to allow a majority of a ball to pass into the head to enter and exit the pocket area;
coupling a sensor to the head in position to interact with the ball in the pocket area; and
disposing a control member in the shaft, the control member configured for,
generating a first indicator that starts a training mode;
monitoring a state of the sensor;
incrementing a value for a counter in response to a change in state of the sensor from a first state to a second state, one each corresponding with the ball entering and exiting the pocket area on the head; and
generating a second indicator that stops the training mode in response to the value of the counter.

22. The method of claim 21, further comprising:
coupling the sensor to the netting in the central open region.

23. The method of claim 21, further comprising:
using the sensor to generate a beam across the central opening.

* * * * *